United States Patent
McPhearson

(10) Patent No.: US 9,844,856 B2
(45) Date of Patent: Dec. 19, 2017

(54) UNIVERSAL ROLLER REBUILDER APPARATUS AND METHOD

(71) Applicant: Roland McPhearson, Mobile, AL (US)

(72) Inventor: Roland McPhearson, Mobile, AL (US)

( * ) Notice: Subject to any disclaimer, the term of this patent is extended or adjusted under 35 U.S.C. 154(b) by 417 days.

(21) Appl. No.: 14/614,474

(22) Filed: Feb. 5, 2015

(65) Prior Publication Data

US 2016/0229034 A1 Aug. 11, 2016

(51) Int. Cl.
| | |
|---|---|
| *B25B 5/14* | (2006.01) |
| *A01D 34/74* | (2006.01) |
| *B25B 5/00* | (2006.01) |
| *A01D 34/00* | (2006.01) |

(52) U.S. Cl.
CPC ............ *B25B 5/147* (2013.01); *A01D 34/001* (2013.01); *A01D 34/74* (2013.01); *B25B 5/003* (2013.01); *B25B 5/006* (2013.01)

(58) Field of Classification Search
CPC ......... B25B 5/147; B25B 5/006; B25B 5/003; A01D 34/74; A01D 34/001
See application file for complete search history.

(56) References Cited

U.S. PATENT DOCUMENTS

| | | | | |
|---|---|---|---|---|
| 2,266,165 | A  * | 12/1941 | Clemson | ............... A01D 34/42 56/249 |
| 7,914,431 | B2 * | 3/2011 | Trevillyan | ............ A01D 34/54 492/47 |

* cited by examiner

*Primary Examiner* — John C Hong
(74) *Attorney, Agent, or Firm* — J. Nevin Shaffer, Jr.

(57) ABSTRACT

A universal roller rebuilder apparatus and method includes a first holder, with an outer angled contact rim. The outer angled contact rim at least partially surrounds an access hole and further is conformed to contact with a roller. The roller includes at least one removable element inside the roller. A second holder includes an outer angled contact rim that at least partially surrounds an access hole. A pair of end brackets are connected with a support frame where the first holder is connected with one end bracket and the second holder is connected with the other end bracket. The pair of end brackets support the first holder and the second holder in alignment such that the roller is held in position with the aligned holders. A puller aligns and connects with the roller in the same alignment as the first holder and the second holder.

20 Claims, 4 Drawing Sheets

UNIVERSAL ROLLER REBUILDER APPARATUS AND METHOD

CROSS REFERENCE TO RELATED APPLICATIONS

This application claims the benefit of previously filed PCT application PCT/US14/50611 filed Aug. 12, 2014 and U.S. provisional patent application No. 61/865,197 filed Aug. 13, 2013 for a "Universal Roller Rebuilder Apparatus and Method". The Applicant hereby claims the benefit of these applications under 35 U.S.C. §119. The entire content of these applications are incorporated herein by this reference.

FIELD OF THE INVENTION

This invention relates to a universal roller rebuilder apparatus and method. In particular, in accordance with one embodiment, the invention relates to a universal roller rebuilder apparatus consisting of a first holder, where the first holder includes an outer angled contact rim and where the outer angled contact rim at least partially surrounds an access hole and further where the outer angled contact rim is conformed to contact with a roller. The roller has an inside and an outside and a length with a diameter and a first end and a second end, and the roller includes at least one removable element, such as, for example only, a roller axle and roller bearings, inside the roller. A second holder is provided, where the second holder includes an outer angled contact rim and where the outer angled contact rim at least partially surrounds an access hole. A support frame is provided and pair of end brackets are connected with the support frame where the first holder is connected with one end bracket and the second holder is connected with the other end bracket. The pair of end brackets support the first holder and the second holder such that the first holder and the second holder are aligned and such that the roller is held in position with the aligned holders. A puller is conformed to align with and connect with the roller in the same alignment as the first holder and the second holder as connected with the pair of end brackets.

BACKGROUND OF THE INVENTION

Rollers are cylinders that are affixed, for purposes of explanation and for example only and not by way of limitation, to mower cutting units that roll along the ground. Rollers suspend the cutting unit above the ground for the purpose of cutting grass/turf at a certain regulated height. Rollers are most often utilized for reel-type mower cutting units in the golf, grounds, and athletic field maintenance industry. Some rollers are utilized as part of rotary-type mower cutting units in the known industry.

A problem exists with regard to the maintenance and repair of rollers. During the roller rebuild process which includes disassembly, cleaning and reassembly, rollers are typically held in a bench vise by squeezing the outside surface of the roller between a pair of vise jaws. This method of holding the roller often fails, allowing the roller to fall out because it is not held securely enough. If the vise is tightened enough to prevent movement of the roller it often causes damage to the roller, deforming the cylinder into an oval shape and/or denting and scarring the surface of the roller.

The operations that are required to be performed during a roller rebuild include removal at least one removable element such as, for example only and not by way of limitation, the axle shaft, bearings, seals, and hubs. The operations also include driving/replacing new bearings, seals and shafts into the roller during reassembly.

Another operation performed during a rebuild process is cleaning. Cleaning may consist of pushing rags through the roller tube and rotating brushes along the inside diameter of the roller tube.

All of these known and other prior art operations create pushing, pulling, rocking and twisting forces that cause the roller to slip out of the vise which results in damage to the roller.

Thus, there is a need in the art for a roller rebuilder apparatus and method that holds a roller against axial movement without damaging the roller during removal and replacement of internal elements of the roller and during cleaning of the roller as well. There is also a need for a roller rebuilder that accommodates rollers of all lengths and diameters.

It therefore is an object of this invention to provide a universal roller rebuilder that holds rollers of any size, length and diameter, against axial movement without damage to the roller

SUMMARY OF THE INVENTION

Accordingly, the universal roller rebuilder apparatus of the present invention, according to one embodiment, includes a first holder, where the first holder includes an outer angled contact rim and where the outer angled contact rim at least partially surrounds an access hole and further where the outer angled contact rim is conformed to contact with a roller. The roller has an inside and an outside and a length with a diameter and a first end and a second end, and the roller includes at least one removable element, such as, for example only, a roller axle and roller bearings, inside the roller. A second holder is provided, where the second holder includes an outer angled contact rim and where the outer angled contact rim at least partially surrounds an access hole. A support frame is provided and pair of end brackets are connected with the support frame where the first holder is connected with one end bracket and the second holder is connected with the other end bracket. The pair of end brackets support the first holder and the second holder such that the first holder and the second holder are aligned and such that the roller is held in position with the aligned holders. A puller is conformed to align with and connect with the roller in the same alignment as the first holder and the second holder as connected with the pair of end brackets.

All terms used herein are given there meaning as known in the art and commonly used. Thus the term "access hole" describes a hole that provides access from one side to the other of an object, in this case, the first and second holders as described hereafter and shown in the accompanying figures. Likewise, the term "align" describes a feature of the invention in which elements of the invention are positioned along a single plane. That is a line horizontal to a level surface along which two or more elements are placed are "aligned". In the invention, the support frame provides the horizontal surface and the other elements of the invention once connected to the support are aligned with each other. The purpose of the alignment is to insure that removal of elements from a roller or insertion into a roller does not damage the inside of the roller or the elements being removed or replaced.

According to other aspects of this embodiment, the at least one removable element in the roller is a roller axle and the puller is conformed to connect with and pull the roller axle from the roller as aligned. In another aspect, the at least one removable element in the roller is a roller bearing and the puller is conformed to connect with and pull the roller bearing from the roller as aligned.

In one aspect, the support frame includes a guide and the pair of end brackets include guide connections conformed to connect with the guide and to connect the end brackets with the support frame.

In another aspect, the invention further includes a puller bridge, the puller bridge conformed to connect with the support frame such that the puller bridge is aligned with the end brackets and the first and second holders and where the puller bridge supports the puller in alignment with the roller. In a further aspect, the puller includes a jacking device, the jacking device conformed to connect with the puller as connected with the roller and the roller axle and roller bearings and to operate the puller to remove the at least one removable element from the roller along the alignment. In a still further aspect, the jacking device includes a screw and a nut where the nut connects with the puller bridge and the screw extends through the nut and puller bridge and connects with the puller with the puller bridge in between.

In one aspect, the puller connects with the roller axle by means of a connector selected from a group consisting of: screws, where the screw screws into the at least one removable element, and pins, where the pin connects the puller with the at least one removable element.

In a further aspect, the puller connects with the at least one removable element by means of an expandable collet, where the expandable collet is placed in the at least one removable element and expanded until it connects with the at least one removable element before removal.

In one aspect, the outer angled contact rim of the second holder is conformed to contact with the roller at the second end of the roller. In another aspect, the access hole of the second holder is larger than the diameter of the roller.

According to another embodiment of the invention a universal roller rebuilder apparatus consists of a first holder, where the first holder includes an outer angled contact rim and where the outer angled contact rim at least partially surrounds an access hole and further where the outer angled contact rim is conformed to contact with a roller, the roller having an inside and an outside and a length with a diameter and a first end and a second end, the roller including at least one removable element inside the roller, the first holder conformed to connect with the first end of the roller. A second holder, where the second holder includes an outer angled contact rim and where the outer angled contact rim at least partially surrounds an access hole. A support frame. A pair of end brackets connected with the support frame where the first holder is connected with one end bracket and the second holder is connected with the other end bracket the pair of end brackets supporting the first holder and the second holder such that the first holder and the second holder are aligned at a certain height above the support frame and where the roller is held in position with the aligned holders at the certain height. And a puller conformed to align with and connect with the at least one removable element in the same alignment at the certain height as the first holder and the second holder as connected with the pair of end brackets.

In one aspect, the support frame includes a guide and the pair of end brackets include guide connections conformed to connect with the guide and to connect the end brackets with the support frame.

In another aspect, the invention further includes a puller bridge, the puller bridge conformed to connect with the support frame such that the puller bridge is aligned at the certain height with the end brackets and the first and second holders and where the puller bridge supports the puller at the certain height in alignment with the roller.

In one aspect, the puller includes a jacking device, the jacking device conformed to connect with the puller as connected with the roller and the at least one removable element to operate the puller to remove the at least one removable element from the roller. In another aspect, the jacking device includes a screw and a nut where the nut connects with the puller bridge and the screw extends through the nut and puller bridge and connects with the puller with the puller bridge in between.

In another aspect, the invention further includes a socket driver connected with the frame and with the puller where the socket driver includes a tool connection for use in installing and removing the at least one removable element.

According to another embodiment of the invention, a universal roller rebuilder method consists of the steps:

a. providing a first holder, where the first holder includes an outer angled contact rim and where the outer angled contact rim at least partially surrounds an access hole and further where the outer angled contact rim is conformed to contact with a roller, the roller having an inside and an outside and a length with a diameter and a first end and a second end, the roller including at least one removable element inside the roller; a second holder, where the second holder includes an outer angled contact rim and where the outer angled contact rim at least partially surrounds an access hole; a support frame; a pair of end brackets connected with the support frame where the first holder is connected with one end bracket and the second holder is connected with the other end bracket the pair of end brackets supporting the first holder and the second holder such that the first holder and the second holder are aligned and where the roller is held in position with the aligned holders; and a puller conformed to align with and connect with the roller in the same alignment as the first holder and the second holder as connected with the pair of end brackets;

b. placing a roller in between the first holder and the second holder such that the first end of the roller is connected with and held in alignment with the first holder and the second end is connected with the second holder such that the roller can not move axially; and c. connecting the puller with the at least one removable element.

In one aspect, the access hole of the second holder is larger than the diameter of the roller and the method includes the step of inserting the roller through the second holder access hole until the first end of the roller is in contact with the outer angled contact rim of the first holder and the roller is held against axial movement and then connecting the puller.

In another aspect, the method further included a puller bridge, the puller bridge conformed to connect with the support frame such that the puller bridge is aligned with the end brackets and the first and second holders and where the puller bridge supports the puller in alignment with the roller.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
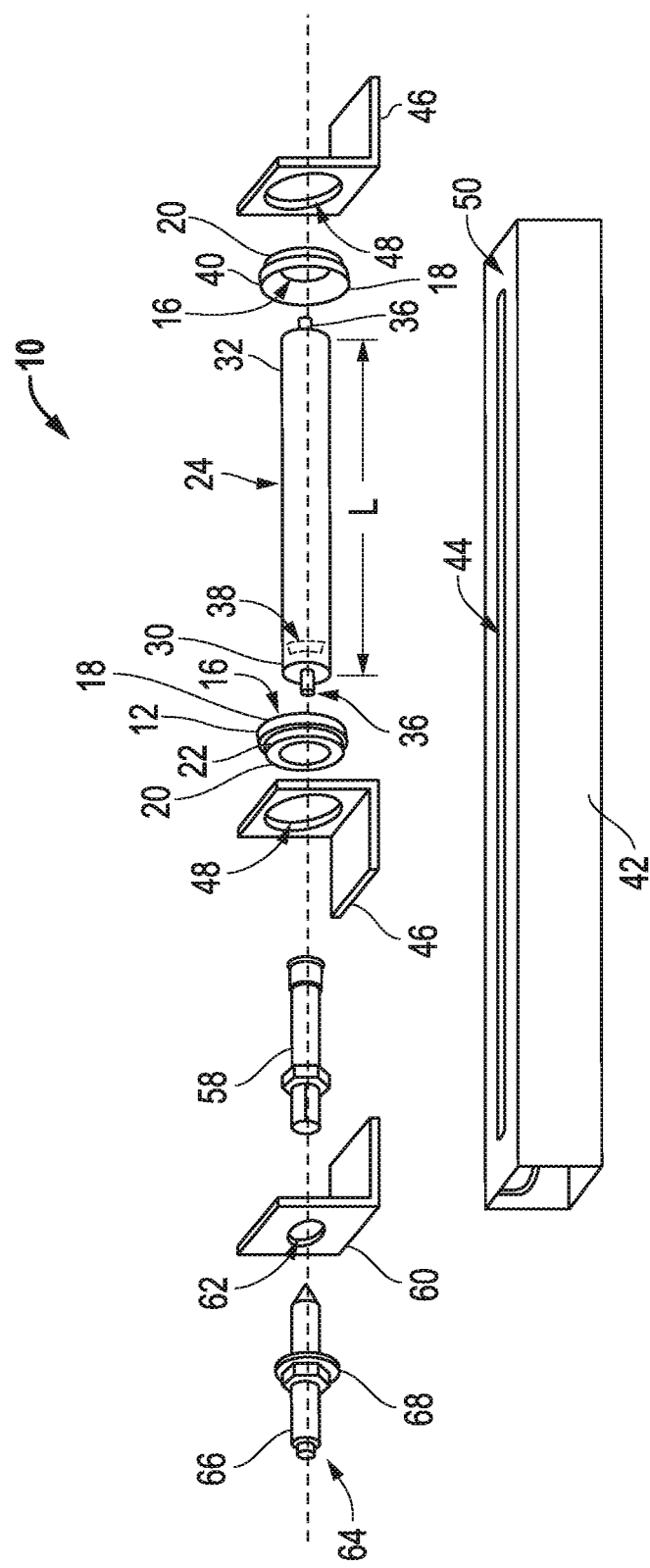
FIG. 1 is an exploded view of the universal roller rebuilder according to one embodiment.
Figure 2:
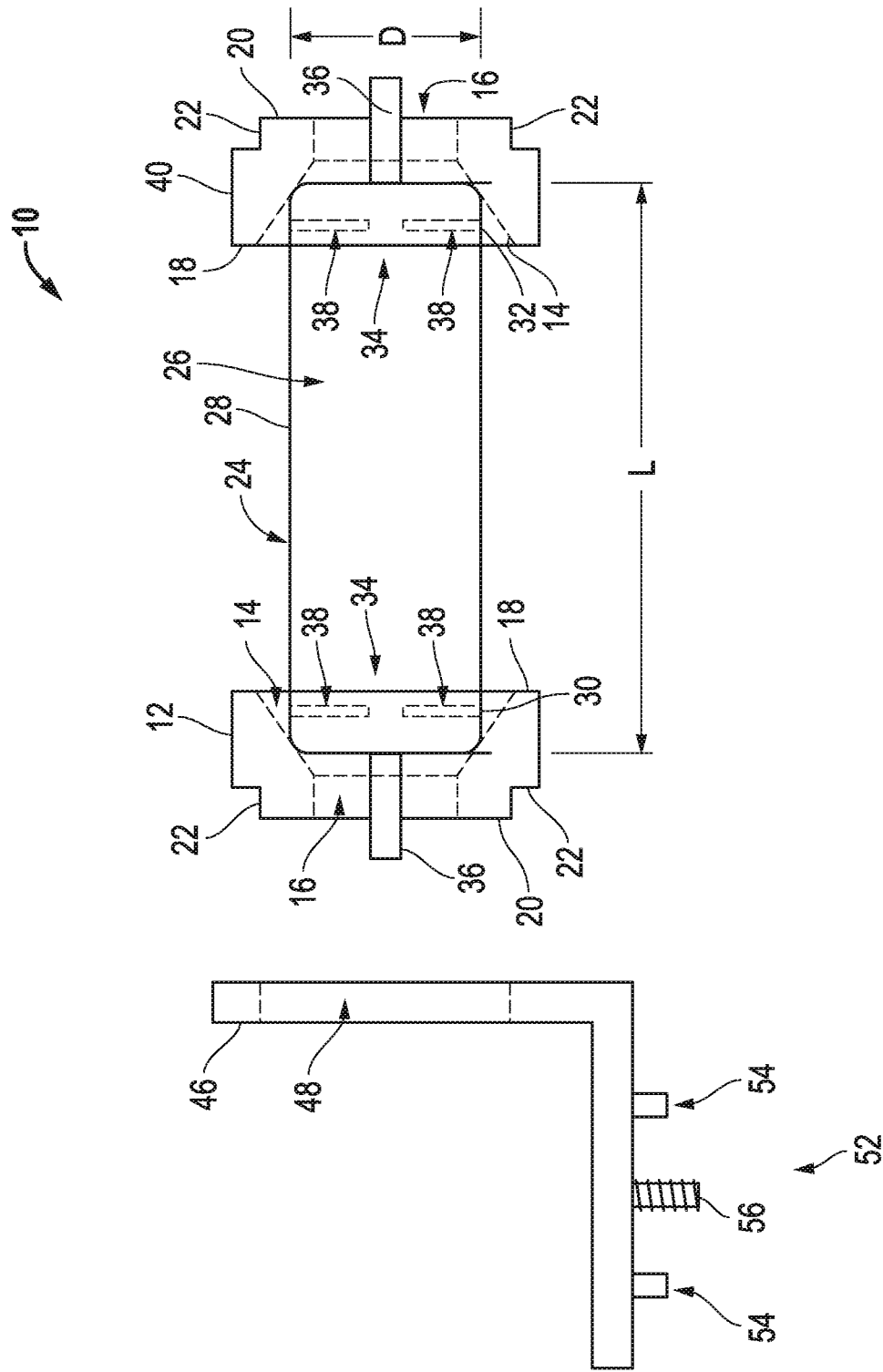
FIG. 2 is a side view of two holders, a roller and one end bracket of the invention of FIG. 1.

The preferred embodiment of the present invention is illustrated by way of example in FIGS. 1-4. With specific reference to FIGS. 1 and 2, a universal roller rebuilder apparatus 10 includes a first holder 12. The first holder 12 includes an outer angled contact rim 14 that at least partially surrounds access hole 16. First holder 12 has a front 18 and a back 20. As illustrated in FIG. 2, outer angled contact rim 14 (shown in dotted lines) is wider, has a larger diameter, at the front 18 of first holder 12 and tapers in diameter as it approaches the back 20. FIG. 2 shows that, in one aspect, the outer angled contact rim 14 stops at the beginning of access hole 16 and access hole 16 has the same diameter for a length until it reaches the back 20 of first holder 12. Certainly, the outer angled contact rim 14 could be a continuous taper from the front 18 to the back 20 of first holder 12 thereby incorporating access hole 16.

First holder 12 also may include a position ledge 22 on the back 22 for use in alignment as will be described more fully hereafter. Position ledge 22 may at least partially surround access hole 16.

Roller 24 has an inside 26 and an outside 28 and a length "L" with a diameter "D" and a first end 30 and a second end 32. Roller 24 includes at least one removable element 34 on the inside 26. For the purpose of illustration only and not by limitation, two internal removable elements are shown, axle 36 and bearing 38.

Still referring to FIGS. 1 and 2, second holder 40 is illustrated. Second holder 40 also includes an outer angled contact rim 14 that at least partially surrounds access hole 16 and a front 18 and back 20 just as first holder 12. Additionally, second holder 40 may also include position ledge 22 all as most clearly shown in FIG. 2.

Support frame 42 is provided. Support frame 42 may be of any size, shape and dimension and may include a guide 44. Support frame 42 may be a long rectangular hollow box shape as shown, for example only, and guide 44 may be a slot running along some portion of the length of the support frame 42 as shown. Guide 44 is used to assist in ensuring alignment of the various elements of the invention longitudinally and horizontally as will be described more fully hereafter.

End brackets 46 are conformed to receive first holder 12 and second holder 40 within end bracket receiver holes 48. End brackets 46 are approximately identical in dimension and construction such that when end brackets 46 are connected with the support frame 42, in guide 44, for example, the end brackets 46 are level and aligned with each other along the flat horizontal surface 50 of support frame 42. Once in position on the support frame 42, this ensures that the end bracket receiver holes 48 are aligned with each other in a straight line and at the same height above the surface 50 of the support frame 42.

First holder 12 and second holder 40 are located in and connected with end brackets 46. Position ledges 22 once inserted into end bracket receiver holes 48 ensure that first holder 12 and second holder 40 are connected at the same height above the support surface 50 and are also aligned longitudinally along the length of support frame 42.

According to one aspect of the invention, as most clearly shown in FIG. 2, end brackets 46 may include guide connections 52. Guide connections 52 may include a pair of guide posts 54 and guide attachment 56. Guide posts 54 once inserted into guide 44 in support frame 42 maintain end brackets 46 in alignment with the guide 44. Guide attachment 56 may be a threaded shaft that extends into guide 44 and extends into the hollow interior of support frame 42. Once the end brackets 46 are positioned where desired, a nut (see FIG. 4) may be used to secure end brackets 46 in place and to hold roller 24 in stable alignment for removal and replacement of removable elements 34, as will be discussed more fully hereafter.

Referring specifically to FIG. 1, puller 58 is shown. Puller 58 is conformed to align with and connect with the at least one removable element 34 in the same alignment as the first holder 12 and the second holder 40 as connected with the pair of end brackets 46. Once the roller 24 is positioned in the holders 12 and 40 as connected with the end brackets 46, puller 58 is used to pull the internal removable element 34 in a manner that does harm the removable element or the inside 26 of the roller 24 since all the parts are aligned. To ensure that puller 58 is connected and pulls in this alignment, a puller bridge 60 may be provided. Puller bridge 60 functions as do end brackets 46 to support puller 58 at puller connection 62 at the same height above the surface 50 as the roller 24. Puller connection 62 may be a threaded area into which puller 58 is screwed, not shown, or any means of connection desired so long as puller 58 is aligned as required with roller 24.

In one aspect, a jacking device 64 is provided. Jacking device 64 is used to manipulate puller 58. Jacking device 64 may include a screw 66 and a nut 68 where nut 68 connects with the puller bridge 60 and the screw 66 extends through nut 68 and puller bridge 60 and connects with puller 58 with the puller bridge 60 in between. In this manner, once the screw 66 is connected with puller 58, operation of the nut 68 manipulates puller 58 to remove elements 34 along the established linear alignment path.

Figure 3A:
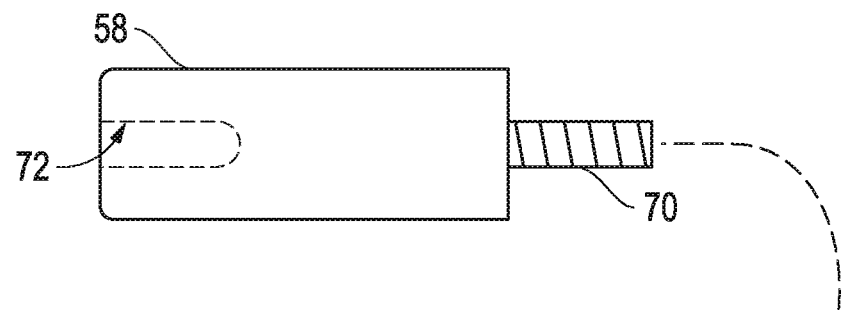
FIG. 3A is a side view of a puller with an extended threaded end.
Figure 3B:
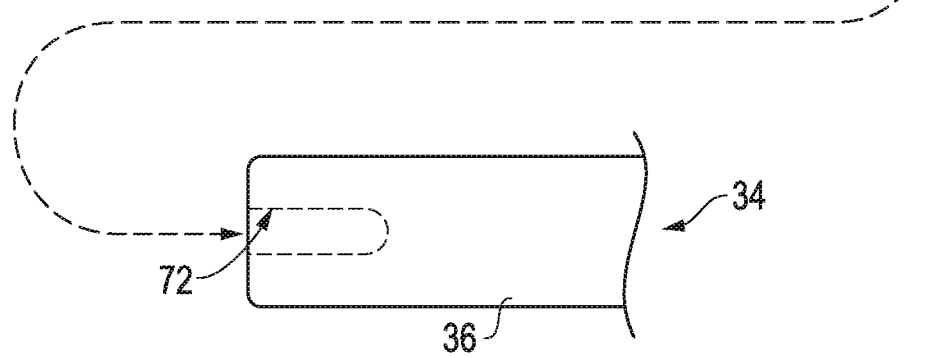
FIG. 3B is a side view of the extended end connectable with a threaded roller shaft.
Figure 3C:
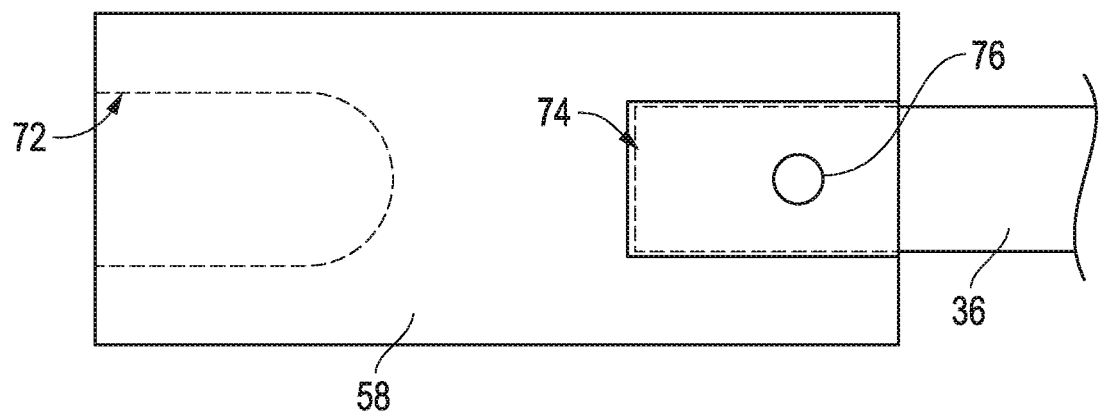
FIG. 3C is a side view of a roller shaft with a pin hole connected with a section of the puller of FIG. 1.

Referring now to FIGS. 3A, 3B and 3C, FIG. 3A shows that puller 58 may include an extended threaded end 70. When present, threaded end 70 cooperates with internal threads 72 in axle 36 as shown in FIG. 3B, for example, to connect puller 58 with this removable element 34. It may be however, as shown in FIG. 3C that puller 58 receives axle 36 in receiver space 74 and a pin 76 is used to connect puller 58 with axle 36. Pin 76 may extend through a pin hole in both the puller 58 and axle 36, for example.

FIGS. 3A and 3C show internal threads 72 on one end of puller 58. Internal threads 72 may be used in connecting jacking screw 66 with puller 58 for example only.

Figure 4:
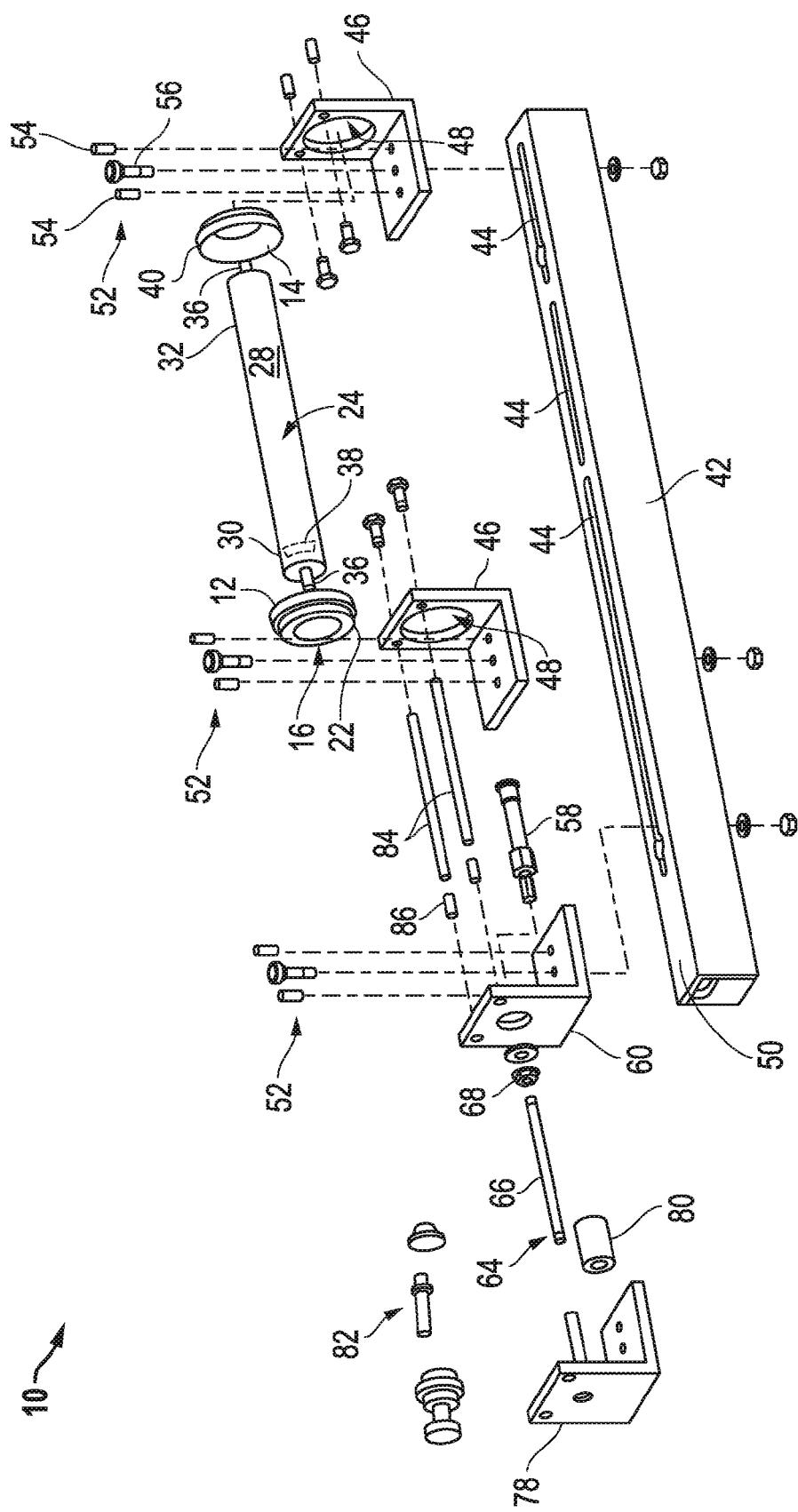
FIG. 4 is an exploded view of another embodiment of the universal roller rebuilder.

Referring now to FIG. 4, the same identification numbers are used throughout all the figures and in this figure showing in detail how the present invention is assembled for operation.

FIG. 4 illustrates a socket driver 78 connectable with support frame 42 as are the above described end brackets 46 and, when present, with puller 58. Socket driver 78 may include a tool connection 80 for use in installing and removing the at least one removable element 34. Tool connection may be a socket that connects on one end with the puller 58 and on the other end with a tool, power or manual, on the other, not shown.

FIG. 4 also shows that puller 58 may also connect with the at least one removable element 34 by means of an expandable collet 82, where the expandable collet 82 is placed in the at least one removable element 34, such as bearing 38, and expanded until it connects with the at least one removable element 34 before removal. Certainly, any means for removal by the puller 58 of the present invention that is deemed necessary and useful is appropriate for the purpose of this disclosure.

FIG. 4 also shows, in detail, other elements of the invention that may be useful but may not be needed such as standoffs 84 and retainer devices 86 for use in positioning puller bridge 60 in relation to end bracket 46 for example only. Likewise, nuts and washers are shown to illustrate a manner for securing elements of the invention as described herein.

By way of continued explanation, the universal roller rebuilder 10 of the present invention according to one aspect is comprised of several components including a support frame 42, a pair of end brackets 46, first holder 12 and second holder 40 and puller 58. The end brackets 46 align with each other by means of the combination of guide 44 in the support frame 42 and guide connections 52, as described above, such that in combination with first holder 12 and second holder 40, they hold the roller 24 in the same alignment as themselves. The end brackets 46 slide along support frame 42 in guide 44 until they are in position to capture roller 24 by means of first holder 12 and second holder 40, as will be more fully described hereafter. Once the end brackets 46 are in position on the flat horizontal surface 50 of support frame 42, they are locked in place with nuts or screws connected with guide attachment 56, for example only, that extends through the guide 44. Thereafter, puller 58 is used to connect with removable elements 34 as described above.

When present, puller bridge 60 or socket driver 78 may be used to support and connect with puller 58. Puller bridge 60 and socket driver 78 are connected with the support frame 42 as are the end brackets 46. Puller bridge 60 provides a pad for the puller 60 to connect with and, when present, for the jacking device 64 nut 68 to bear against. Puller screw 66 extends through the puller nut 68 and is attached to puller 58 or may be even directly connected with removable elements 34. The puller nut 68 is then turned, causing the puller screw 66 and attached removable element 34 to be removed from the roller 24. When present, socket driver 78, fitted with tool connection 80, such as a socket, is used to either tighten or loosen axle shaft nuts, for example only, on either end of the roller 24.

Further, universal roller rebuilder 10 is structured uniquely to hold rollers 24 of any type and size without causing serious damage to the roller 24 during the rebuilding, including disassembly and reassembly. The invention may be used in a variety of ways to hold the roller 24. One method captures the roller 24 between the first holder 12 and the second holder 40. The outer angled contact rim 14 accommodates rollers of any diameter "D". The holders are first placed into end bracket receiver holes 48 in end brackets 46 and then the roller 24 is placed with its first end 30 in first holder 12 and its second end 32 in second holder 40. The end brackets 46 are then pressed together and secured in place on support frame 42. In this manner, roller 24 is held against axial and radial motion. That is, the roller 24 is prevented from turning or moving longitudinally or up or down within the holders as the rebuilding process is accomplished.

According to one aspect of the invention, for example only, the access hole 16 for second holder 40 is larger than the diameter "D" of the roller 24. In this embodiment, a roller 24 may be easily slipped into the required aligned position by sliding it through the just larger access hole 16 in second holder 40. Once the puller 58 is connected with the removable element 34, the roller is held against longitudinal movement by means of connection with first holder 12. Because the access hole 40 in second holder 40 is just larger than the diameter "D" of the roller 24, this combination also prevents up and down or side to side motion as well. This is useful when only such movement is to be prevented and it greatly speeds up the set up process.

Both set ups and structure align the roller 24 with the puller 58 and such. The structure of the device ensures that all elements are aligned so that no damage is done to the roller and the removable elements 34. The puller bridge 60, for example, supports the puller 58 and positions it exactly at the same height above the surface 50 of support frame 42 as the longitudinal axis of the roller 24 as held by holders 12 and 40 in end brackets 46. This ensures, again, that there is no side pressure or stress or wasted energy on the puller 58 and the puller 58 works efficiently and without damaging the roller 24.

Still further, the taper of the outer angled contact rims 14 of holders 12 and 40 cooperate to "capture" the roller 24 on the radius of the first and second ends, 30 and 32, of roller 24. This action also, again, aligns the roller 24 at a certain height above the support frame 42 with the other elements of the invention, such as the puller bridge 60 when present, which are also suspended or supported at the same certain height above the support frame 42.

In summary, Applicants universal roller rebuilder apparatus and method 10 has the capability to hold different types, sizes and brands of rollers 24 securely during the rebuild process, including disassembly, cleaning and reassembly without resulting in damage to the roller 24.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A universal roller rebuilder apparatus comprising:
   a. a first holder, wherein said first holder includes an outer angled contact rim and wherein said outer angled contact rim at least partially surrounds an access hole and further wherein said outer angled contact rim is conformed to contact with a roller, said roller having an inside and an outside and a length with a diameter and a first end and a second end, the roller including at least one removable element inside said roller;
   b. a second holder, wherein said second holder includes an outer angled contact rim and wherein said outer angled contact rim at least partially surrounds an access hole;
   c. a support frame;
   d. a pair of end brackets connected with said support frame wherein said first holder is connected with one end bracket and said second holder is connected with the other end bracket said pair of end brackets supporting said first holder and said second holder such that the first holder and the second holder are aligned and wherein said roller is held in position with the aligned holders; and e. a puller conformed to align with and connect with said at least one removable element in same alignment as the first holder and the second holder as connected with the pair of end brackets.

2. The apparatus of claim 1 wherein said at least one removable element in said roller is a roller axle and said puller is conformed to connect with and pull said roller axle from said roller as aligned.

3. The apparatus of claim 1 wherein said at least one removable element in said roller is a roller bearing and said puller is conformed to connect with and pull said roller bearing from said roller as aligned.

4. The apparatus of claim 1 wherein said support frame includes a guide and said pair of end brackets include guide connections conformed to connect with said guide and to connect said end brackets with said support frame.

5. The apparatus of claim 1 further including a puller bridge, said puller bridge conformed to connect with said support frame such that said puller bridge is aligned with said end brackets and said first and second holders and wherein said puller bridge supports said puller in alignment with said roller.

6. The apparatus of claim 5 wherein said puller includes a jacking device, said jacking device conformed to connect with said puller as connected with said roller and said roller axle and roller bearings and to operate said puller to remove the at least one removable element from said roller along said alignment.

7. The apparatus of claim 6 wherein said jacking device includes a screw and a nut wherein said nut connects with said puller bridge and said screw extends through said nut and puller bridge and connects with said puller with said puller bridge in between.

8. The apparatus of claim 1 wherein said puller connects with said roller axle by means of a connector selected from a group consisting of: screws, wherein said screw screws into the at least one removable element, and pins, wherein said pin connects said puller with said at least one removable element.

9. The apparatus of claim 1 wherein said puller connects with said at least one removable element by means of an expandable collet, wherein said expandable collet is placed in the at least one removable element and expanded until it connects with the at least one removable element before removal.

10. The apparatus of claim 1 wherein said outer angled contact rim of said second holder is conformed to contact with said roller at said second end of said roller.

11. The apparatus of claim 1 wherein said access hole of said second holder is larger than the diameter of said roller.

12. A universal roller rebuilder apparatus comprising:
a. a first holder, wherein said first holder includes an outer angled contact rim and wherein said outer angled contact rim at least partially surrounds an access hole and further wherein said outer angled contact rim is conformed to contact with a roller, said roller having an inside and an outside and a length with a diameter and a first end and a second end, the roller including at least one removable element inside said roller, said first holder conformed to connect with said first end of said roller;
b. a second holder, wherein said second holder includes an outer angled contact rim and wherein said outer angled contact rim at least partially surrounds an access hole;
c. a support frame;
d. a pair of end brackets connected with said support frame wherein said first holder is connected with one end bracket and said second holder is connected with the other end bracket said pair of end brackets supporting said first holder and said second holder such that the first holder and the second holder are aligned at a certain height above said support frame and wherein said roller is held in position with the aligned holders at said certain height; and
e. a puller conformed to align with and connect with said at least one removable element in same alignment at said certain height as the first holder and the second holder as connected with the pair of end brackets.

13. The apparatus of claim 12 wherein said support frame includes a guide and said pair of end brackets include guide connections conformed to connect with said guide and to connect said end brackets with said support frame.

14. The apparatus of claim 12 further including a puller bridge, said puller bridge conformed to connect with said support frame such that said puller bridge is aligned at said certain height with said end brackets and said first and second holders and wherein said puller bridge supports said puller at said certain height in alignment with said roller.

15. The apparatus of claim 14 wherein said puller includes a jacking device, said jacking device conformed to connect with said puller as connected with said roller and said at least one removable element to operate said puller to remove the at least one removable element from said roller.

16. The apparatus of claim 15 wherein said jacking device includes a screw and a nut wherein said nut connects with said puller bridge and said screw extends through said nut and puller bridge and connects with said puller with said puller bridge in between.

17. The apparatus of claim 12 further including a socket driver connected with said frame and with said puller wherein said socket driver includes a tool connection for use in installing and removing said at least one removable element.

18. A universal roller rebuilder method comprising:
a. providing a first holder, wherein said first holder includes an outer angled contact rim and wherein said outer angled contact rim at least partially surrounds an access hole and further wherein said outer angled contact rim is conformed to contact with a roller, said roller having an inside and an outside and a length with a diameter and a first end and a second end, the roller including at least one removable element inside said roller; a second holder, wherein said second holder includes an outer angled contact rim and wherein said outer angled contact rim at least partially surrounds an access hole; a support frame; a pair of end brackets connected with said support frame wherein said first holder is connected with one end bracket and said second holder is connected with the other end bracket said pair of end brackets supporting said first holder and said second holder such that the first holder and the second holder are aligned and wherein said roller is held in position with the aligned holders; and a puller conformed to align with and connect with said roller in same alignment as the first holder and the second holder as connected with the pair of end brackets;
b. placing a roller in between the first holder and the second holder such that said first end of said roller is connected with and held in alignment with said first holder and the second end is connected with said second holder such that said roller can not move axially; and
c. connecting said puller with said at least one removable element.

19. The method of claim 18 wherein said access hole of said second holder is larger than the diameter of the roller and the method includes the step of inserting said roller through said second holder access hole until said first end of said roller is in contact with said outer angled contact rim of said first holder and said roller is held against axial movement and then connecting said puller.

20. The method of claim 18 further including a puller bridge, said puller bridge conformed to connect with said support frame such that said puller bridge is aligned with said end brackets and said first and second holders and wherein said puller bridge supports said puller in alignment with said roller.

\* \* \* \* \*